US011429814B2

(12) United States Patent
Kawai

(10) Patent No.: US 11,429,814 B2
(45) Date of Patent: Aug. 30, 2022

(54) LEARNING IMAGE GENERATION APPARATUS, LEARNING IMAGE GENERATION METHOD, AND NON-TRANSITORY STORAGE MEDIUM

(71) Applicant: NEC CORPORATION, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/044,405

(22) PCT Filed: Apr. 12, 2018

(86) PCT No.: PCT/JP2018/015400
§ 371 (c)(1),
(2) Date: Oct. 1, 2020

(87) PCT Pub. No.: WO2019/198200
PCT Pub. Date: Oct. 17, 2019

(65) Prior Publication Data
US 2021/0117731 A1     Apr. 22, 2021

(51) Int. Cl.
*G06K 9/62*  (2022.01)
*G06T 7/70*  (2017.01)
(Continued)

(52) U.S. Cl.
CPC .......... *G06K 9/6262* (2013.01); *G06T 7/20* (2013.01); *G06T 7/70* (2017.01); *G06T 11/60* (2013.01);
(Continued)

(58) Field of Classification Search
None
See application file for complete search history.

(56) References Cited

U.S. PATENT DOCUMENTS

2003/0185461 A1 * 10/2003 Ohshima ............... H04N 5/272
382/284
2010/0128926 A1 * 5/2010 Iwasaki ............. G06K 9/00335
382/103
(Continued)

FOREIGN PATENT DOCUMENTS

JP    2010-511241 A      4/2010
JP    2014-178957    *   9/2014
(Continued)

OTHER PUBLICATIONS

Le Cun et al., "Gradient-based learning applied to document recognition", Proceedings of the IEEE, Nov. 1998, 46 pages.
(Continued)

*Primary Examiner* — Delomia L Gilliard
(74) *Attorney, Agent, or Firm* — Sughrue Mion, PLLC

(57) ABSTRACT

The present invention provides a learning image generation apparatus (100) including: a background image acquisition unit (111) that acquires a background image; a background camera posture information acquisition unit (112) that acquires posture information of a background camera which generates a background image; an object continuous image acquisition unit (113) that acquires an object continuous image including an object; a synthesis position determination unit (121) that determines a synthesis position on the background image of the object included in each of a plurality of object still images included in the object continuous image based on the posture information of the background camera; and an image synthesis unit (131) that synthesizes the objects included in each of the plurality of object still images with the background image to generate a synthesis continuous image based on the background image, the object continuous image, the synthesis position.

9 Claims, 14 Drawing Sheets

(51) Int. Cl.
*G06T 7/20* (2017.01)
*G06T 11/60* (2006.01)
*G06V 40/10* (2022.01)

(52) U.S. Cl.
CPC .... *G06V 40/10* (2022.01); *G06T 2207/30196* (2013.01); *G06T 2207/30244* (2013.01)

(56) References Cited

U.S. PATENT DOCUMENTS

2010/0315522 A1\* 12/2010 Tsurumi ............. H04N 5/23238
　　　　　　　　　　　　　　　　　　348/222.1
2021/0004943 A1\* 1/2021 Fukasawa ............... G06T 7/174

FOREIGN PATENT DOCUMENTS

| JP | 2014-178957 A | 9/2014 |
| JP | 6008045 B2 | 10/2016 |
| JP | 2017-045441 A | 3/2017 |

OTHER PUBLICATIONS

International Search Report for PCT/JP2018/015400 dated Jun. 5, 2018.

\* cited by examiner

LEARNING IMAGE GENERATION APPARATUS, LEARNING IMAGE GENERATION METHOD, AND NON-TRANSITORY STORAGE MEDIUM

CROSS REFERENCE TO RELATED APPLICATIONS

This application is a National Stage of International Application No. PCT/JP2018/015400 filed Apr. 12, 2018, the disclosure of which is incorporated herein in its entirety by reference.

TECHNICAL FIELD

The present invention relates to a learning image generation apparatus, a learning image generation method, and a program.

BACKGROUND ART

In recent years, a number of technologies which detect a suspicious person or a person who performs an abnormal action by processing an image of a surveillance camera or the like by a computer have been developed. Such technologies are often established based on machine learning.

As a machine learning technology widely used recently, there is a technology called deep learning, which is represented by a convolutional neural network (CNN) described in Non-Patent Document 1. With this technology, it is possible to obtain a high recognition rate for various recognition targets.

In deep learning, a large amount of learning data is needed. Depending on the recognition target, a means of obtaining or the like a large amount of learning images using images and videos uploaded on the Internet is provided, but it is difficult to collect images by using the Internet or the like since a video used for surveillance is not a video open to the public.

Therefore, a technology of artificially generating an image for learning is proposed. For example, in Patent Document 1, by pasting an image of several people on a background image, an image filled with persons is reproduced and used for recognizing a congestion situation. Further, in Patent Document 2, when two images are synthesized to generate a new image, color information for one is converted to be similar to color information for the other, color unnaturalness is suppressed.

RELATED DOCUMENT

Patent Document

[Patent Document 1] Japanese Patent No. 6008045
[Patent Document 2] Japanese Patent Application Publication No. 2017-45441

Non-Patent Document

[Non-Patent Document 1] LeCun et al., "Gradient-based learning applied to document recognition", Proceedings of the IEEE, 1998

SUMMARY OF THE INVENTION

Technical Problem

Patent Documents 1 and 2 are premised on generation of a still image. However, when recognizing a behavior of a person, it is often necessary to recognize a video for a certain period, that is, a certain number of still images which are continuous in time (hereinafter, referred to as "continuous image"). In a case of generating a learning image configured with the continuous images, it is necessary to reduce an unnatural movement of an object shown in the continuous images. Patent Document 1, Patent Document 2, and Non-Patent Document 1 do not disclose a means which solves the problem.

An object of the present invention is to provide a means which increases the number of learning images which are configured with continuous images and in which unnatural motion of an object shown in the continuous images is reduced.

Solution to Problem

According to the present invention, there is provided a learning image generation apparatus including: a background image acquisition unit that acquires a background image; a background camera posture information acquisition unit that acquires posture information of a background camera which generates the background image; an object continuous image acquisition unit that acquires an object continuous image including an object; a synthesis position determination unit that determines a synthesis position on the background image of the object included in each of a plurality of object still images included in the object continuous image based on the posture information of the background camera; and an image synthesis unit that synthesizes the object included in each of the plurality of object still images with the background image to generate a synthesis continuous image, based on the background image, the object continuous image, and the synthesis position determined by the synthesis position determination unit.

In addition, according to the present invention, there is provided a learning image generation method executed by a computer, the method including a background image acquisition step of acquiring a background image; a background camera posture information acquisition step of acquiring posture information of a background camera which generates the background image; an object continuous image acquisition step of acquiring an object continuous image including an object; a synthesis position determination step of determining a synthesis position on the background image of the object included in each of a plurality of object still images included in the object continuous image based on the posture information of the background camera; and an image synthesis step of synthesizing the object included in each of the plurality of object still images with the background image to generate a synthesis continuous image, based on the background image, the object continuous image, and the synthesis position determined by the synthesis position determination unit.

In addition, according to the present invention, there is provided a program causing a computer to function as: a background image acquisition unit that acquires a background image; a background camera posture information acquisition unit that acquires posture information of a background camera which generates the background image; an object continuous image acquisition unit that acquires an object continuous image including an object; a synthesis position determination unit that determines a synthesis position on the background image of the object included in each of a plurality of object still images included in the object continuous image based on the posture information of the background camera; and an image synthesis unit that synthesizes the object included in each of the plurality of object still images with the background image to generate a synthesis continuous image, based on the background image, the object continuous image, and the synthesis position determined by the synthesis position determination unit.

Advantageous Effects of Invention

According to the present invention, it is possible to increase the number of learning images which are configured with continuous images and in which unnatural motion of an object shown in the continuous images is reduced.

BRIEF DESCRIPTION OF THE DRAWINGS

The above objects and other objects, features and advantages will become more apparent from the following description of the preferred example embodiments and the accompanying drawings.

DESCRIPTION OF EMBODIMENTS

First Example Embodiment

First, an outline of a learning image generation apparatus according to the present example embodiment will be described. The learning image generation apparatus synthesizes an object included in each of a plurality of still images included in a continuous image with a background image to generate a plurality of continuous images. The learning image generation apparatus determines a synthesis position of the object on the background image by using posture information of a background camera when the background image is generated. By determining the synthesis position by using the posture information, it is possible to reduce unnaturalness in motion of the object shown in the continuous images generated by the synthesis. Hereinafter, details will be described.

Figure 1:
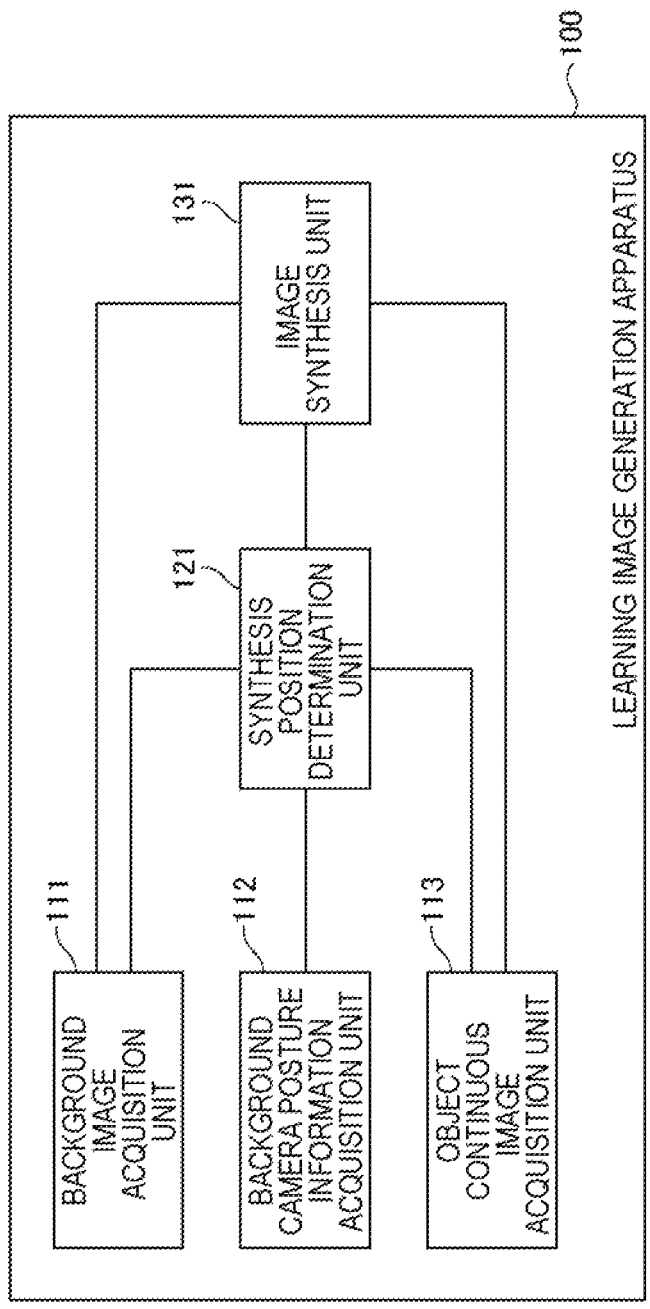
FIG. 1 is an example of a functional block diagram of a learning image generation apparatus according to the present example embodiment.

FIG. 1 illustrates an example of a functional block diagram of a learning image generation apparatus 100. The functional block diagram illustrates blocks in functional units, not in hardware units. The learning image generation apparatus 100 may be configured by a plurality of apparatuses physically and/or logically separated, or may be configured by one apparatus physically and logically.

As illustrated, the learning image generation apparatus 100 includes a background image acquisition unit 111, a background camera posture information acquisition unit 112, an object continuous image acquisition unit 113, a synthesis position determination unit 121, and an image synthesis unit 131.

Each functional unit included in the learning image generation apparatus 100 is realized by any combination of hardware and software based on a central processing unit (CPU), a memory, a program loaded in the memory, a storage unit (which can store, in addition to the program stored from a stage of shipping the apparatus in advance, a program downloaded from a storage medium such as a compact disc (CD) or a server on the internet) such as a hard disc storing the program, and a network connection interface of any computer. Those skilled in the art understand that there are various modification examples to a realization method and the apparatus.

Figure 2:
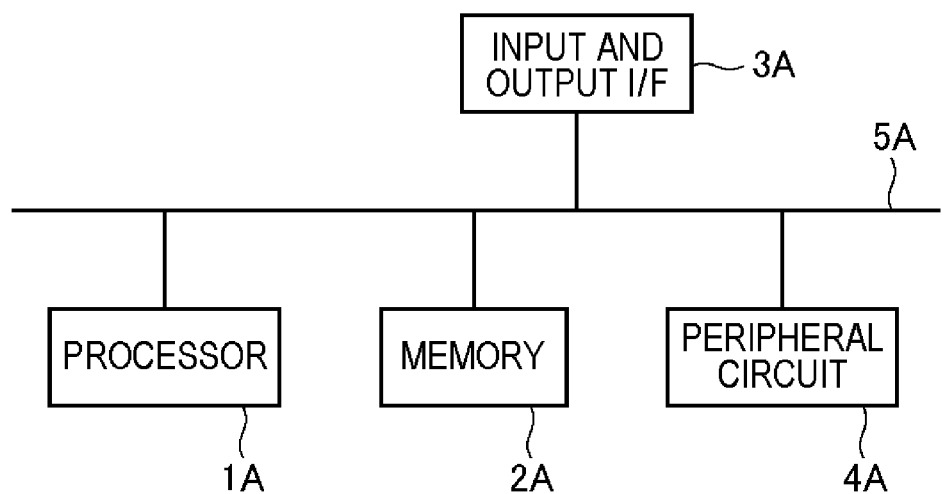
FIG. 2 is a diagram illustrating an example of a hardware configuration of the learning image generation apparatus according to the present example embodiment.

FIG. 2 is a block diagram illustrating a hardware configuration of the learning image generation apparatus 100 according to the present example embodiment. As illustrated in FIG. 2, the learning image generation apparatus 100 includes a processor 1A, a memory 2A, an input and output interface 3A, a peripheral circuit 4A, and a bus 5A. The peripheral circuit 4A includes various modules. Note that, the apparatus may not include the peripheral circuit 4A.

The bus 5A is a data transmission line through which the processor 1A, the memory 2A, the peripheral circuit 4A and, the input and output interface 3A transmit and receive data to and from one another. The processor 1A is an arithmetic processing apparatus such as a CPU or a graphics processing unit (GPU), for example. The memory 2A is a memory such as a random access memory (RAM) or a read only memory (ROM), for example. The input and output interface 3A includes an interface for acquiring information from an input apparatus, an external apparatus, an external server, an external sensor, and the like and an interface for outputting information from an output apparatus, the external apparatus, the external server, and the like. The input apparatus is, for example, a keyboard, a mouse, a microphone, or the like. The output apparatus is, for example, a display, a speaker, a printer, an emailer, or the like. The processor 1A can output a command to each module and perform arithmetic based on the operation result.

Figure 3:
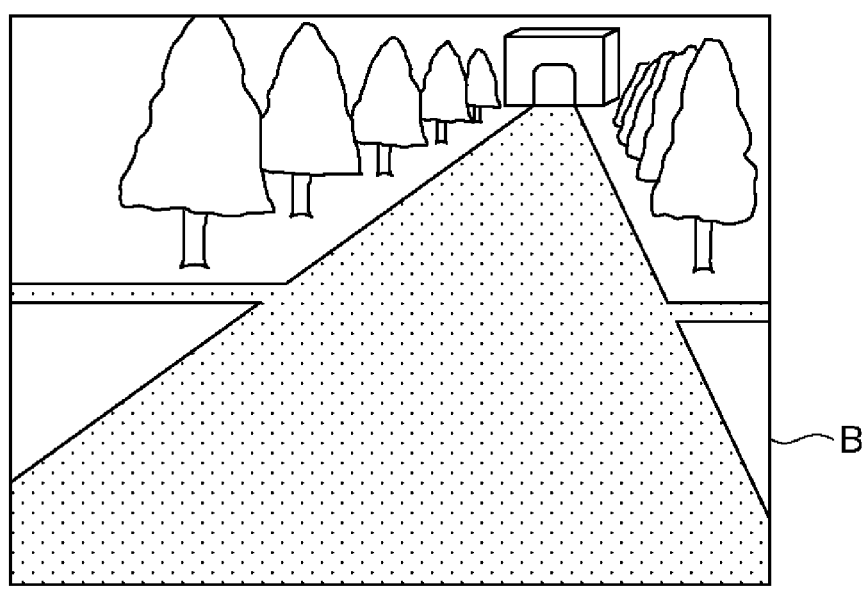
FIG. 3 is a diagram illustrating an example of a background image of the present example embodiment.

Returning to FIG. 1, the background image acquisition unit 111 acquires a background image. FIG. 3 illustrates an example of a background image B.

Here, "acquisition" in the present example embodiment will be described. The "acquisition" in the present example embodiment includes at least one of active acquisition and passive acquisition. The active acquisition can include, for example, the own apparatus (the learning image generation apparatus 100) performing acquisition of data or information stored in another apparatus or a storage apparatus of the own apparatus. The active acquisition includes, for example, transmitting a request or an inquiry from the own apparatus to another apparatus and receiving data or information returned in response to the request or the inquiry, accessing and reading a storage apparatus of the other apparatus or the own apparatus, and the like. The passive acquisition can include acquiring data or information voluntarily output from another apparatus to the own apparatus. The passive acquisition is, for example, receiving data or information distributed, transmitted, push-notified, or the like, or data or information input via an input apparatus included in the own apparatus or an input apparatus connected to the own apparatus. The acquisition may include selectively acquiring received data or information, and selectively receiving distributed data or information. Note that, the premise regarding the acquisition is the same in all the following example embodiments.

The background camera posture information acquisition unit 112 acquires posture information of a background camera which generates a background image acquired by the background image acquisition unit 111 when the background image is generated. The posture information includes at least each element of a focal length of the camera, a lens center of the camera, and a rotation matrix and a translation vector of the camera.

For example, with camera calibration, internal parameters (a focal length, image center coordinates, a distortion coefficient, and the like) or external parameters (a rotation matrix, a translation vector, and the like) of the camera when the background image is generated may be computed. The background camera posture information acquisition unit 112 may acquire the internal parameter or the external parameter as posture information.

Figure 4:
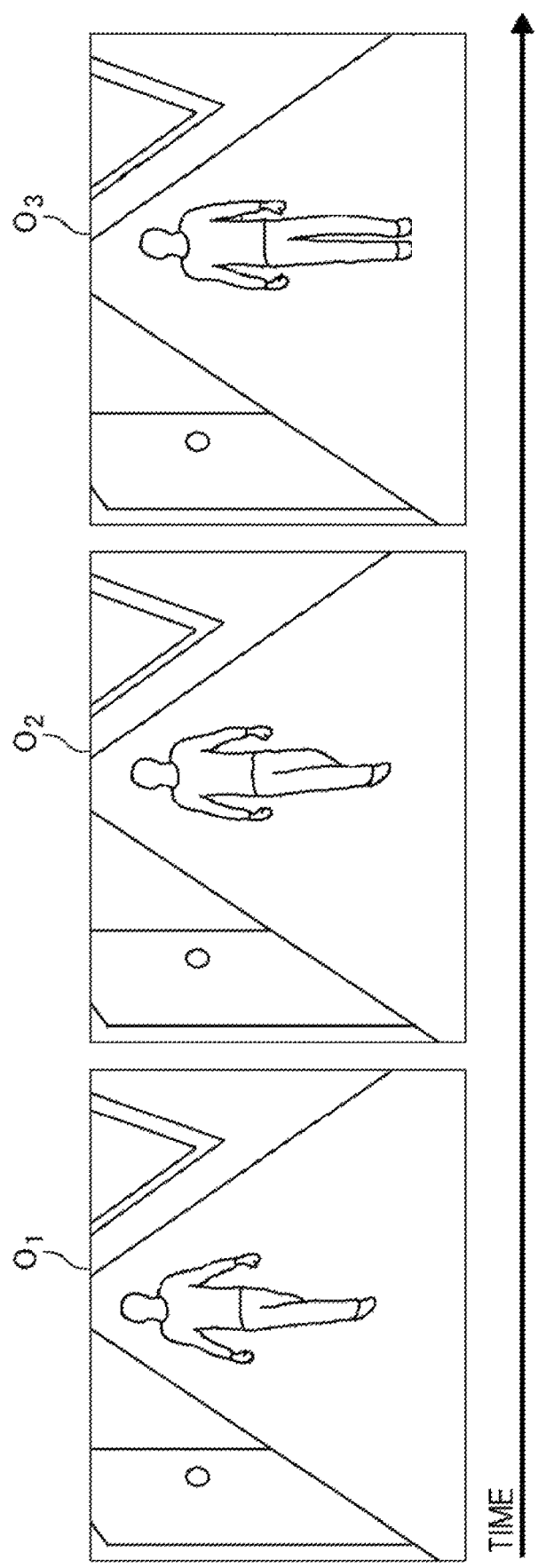
FIG. 4 is a diagram illustrating an example of an object continuous image of the present example embodiment.

The object continuous image acquisition unit 113 acquires an object continuous image, which is a plurality of continuous images including an object. The object is included in each of a plurality of still images included in the object continuous image. Hereinafter, the still image included in the object continuous image is referred to as "object still image". The object is preferably moving, but may be stationary. FIG. 4 illustrates an example of the object continuous image. In FIG. 4, object still images $O_1$ to $O_3$ are illustrated. Each of the object still images $O_1$ to $O_3$ includes the same person (an object).

The synthesis position determination unit 121 determines a synthesis position of the object included in each of the plurality of object still images on a background image, based on posture information of a background camera.

By using the posture information of the background camera, coordinates shown in a two-dimensional coordinate system set on the image (hereinafter, referred to as "coordinates on an image" in some cases) and coordinates (hereinafter, referred to as "coordinates in the real space" in some cases) shown in a three-dimensional coordinate system (hereinafter, referred to as "coordinate system in a real space" in some cases) set in a real space can be mutually converted with each other. By using this, the synthesis position of the object in the two-dimensional coordinate system set on the image can be determined so that a movement distance of the object in the real space is natural. As a result, the synthesis position determined by the synthesis position determination unit 121 makes the movement distance of the object shown in a synthesis continuous image natural. Note that, a technology of mutually converting the coordinates on the image and the coordinates on the real space by using the posture information of the camera is a well-known technology, and thus the description thereof will not be repeated here.

Figure 5:
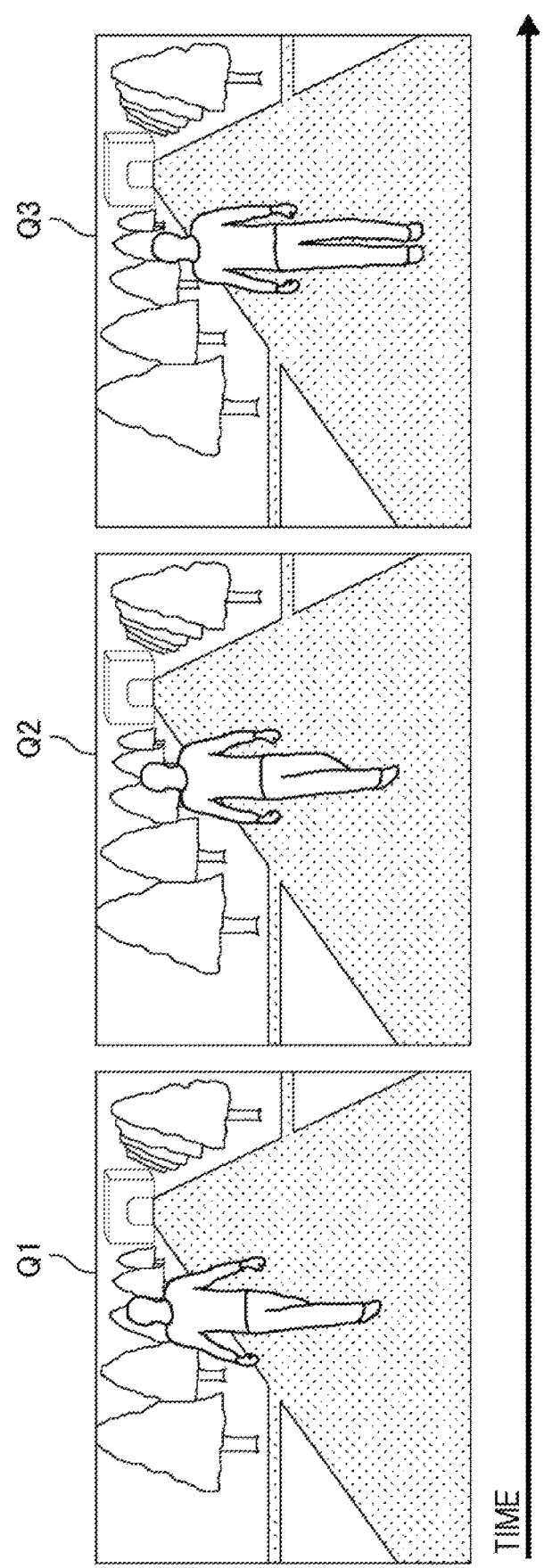
FIG. 5 is a diagram illustrating an example of a synthesis continuous image of the present example embodiment.

Based on the background image acquired by the background image acquisition unit 111, the object continuous image acquired by the object continuous image acquisition unit 113, and the synthesis position determined by the synthesis position determination unit 121, the image synthesis unit 131 synthesizes the object included in each of the plurality of object still images with the background image and generates a plurality of synthesis still images to generate a synthesis continuous image. For example, the image synthesis unit 131 synthesizes a person included in the object still image $O_1$ in FIG. 4 with the background image B in FIG. 3 to generate a synthesis still image $O_1$ in FIG. 5. In addition, the image synthesis unit 131 synthesizes the person included in the object still image $O_2$ in FIG. 4 with the background image B in FIG. 3 to generate a synthesis still image $O_2$ in FIG. 5. Further, the image synthesis unit 131 synthesizes the person included in the object still image $O_3$ in FIG. 4 with the background image B in FIG. 3 to generate a synthesis still image $O_3$ in FIG. 5.

The image synthesis unit 131 cuts out an image of a partial area from each of the plurality of object still images, and synthesizes the cut images with the background image. The cut-out area is an area in which the object exists. There are various units which determine the area to be cut out from the object still image, and an example will be described below.

Figure 6:
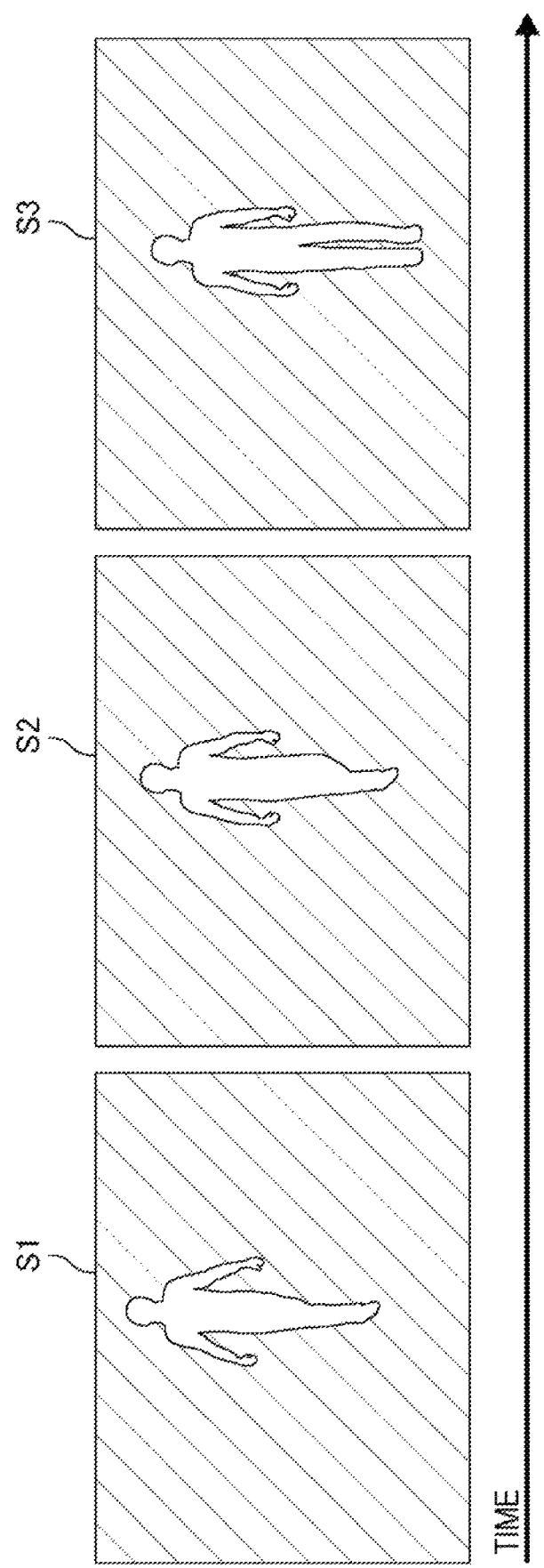
FIG. 6 is a diagram illustrating an example of a silhouette image of the present example embodiment.

For example, information indicating a position on the image of the object included in each of the plurality of object still images may be generated in advance. Based on the information, the image synthesis unit 131 may determine a partial area to be cut out from each of the plurality of object still images. The information may be, for example, a silhouette image as illustrated in FIG. 6. The illustrated silhouette images $S_1$ to $S_3$ indicate positions on the image of the person included in the plurality of object still images $O_1$ to $O_3$ illustrated in FIG. 4, respectively. The silhouette image is, for example, an image in which a pixel including a body including the person's clothes is painted in white and a pixel not including the body is painted in black.

In addition, the image synthesis unit 131 may detect an object included in each of the plurality of object still images by using any image analysis unit such as a binarization process, a contour extraction process, and pattern matching. The image synthesis unit 131 may determine an area in which the detected object exists as the area to be cut out.

Figure 7:
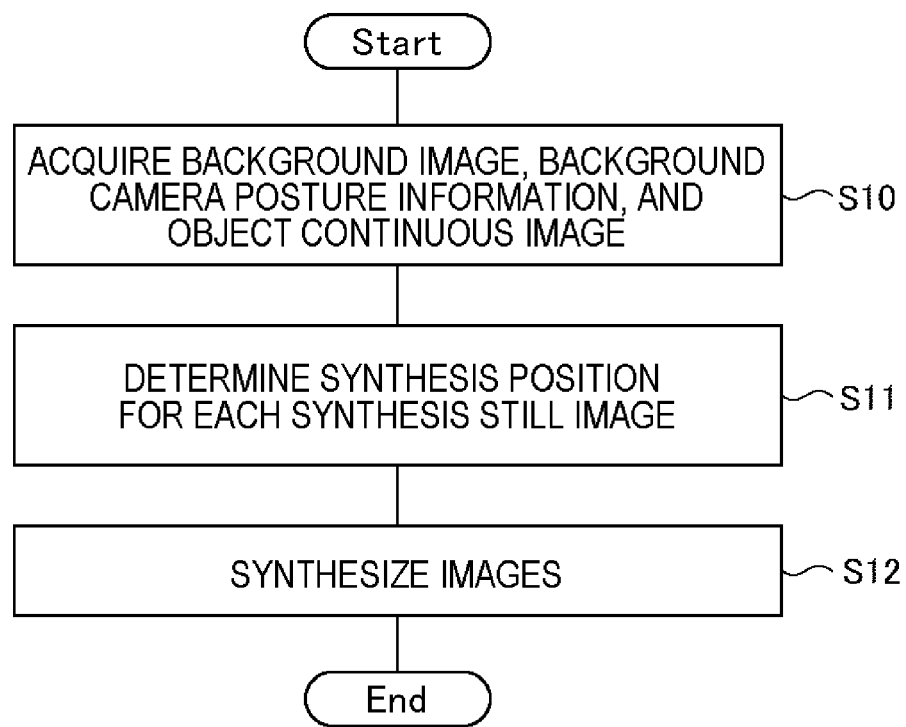
FIG. 7 is a flowchart illustrating an example of a processing flow of the learning image generation apparatus according to the present example embodiment.

Next, an example of a flow of a process of the learning image generation apparatus 100 according to the present example embodiment will be described by using the flowchart in FIG. 7.

In S10, the background image acquisition unit 111 acquires a background image. In S10, the background camera posture information acquisition unit 112 acquires posture information of a background camera at a time when the background image is generated, the camera generating the background image acquired by the background image acquisition unit 111. Further, in S10, the object continuous image acquisition unit 113 acquires an object continuous image including an object.

Note that, the background image acquisition unit 111 may acquire the background image, the background camera posture information acquisition unit 112 may acquire the posture information of the background camera, and the object continuous image acquisition unit 113 may acquire the object continuous image in any order or in parallel.

In S11, the synthesis position determination unit 121 determines a synthesis position on the background image of the object included in each of the plurality of object still images included in the object continuous image based on the posture information of the background camera.

In S12, based on the background image acquired by the background image acquisition unit 111, the object continuous image acquired by the object continuous image acquisition unit 113, and the synthesis position determined by the synthesis position determination unit 121, the image synthesis unit 131 synthesizes the object included in each of the plurality of object still images with the background image and generates a plurality of synthesis still images to generate a synthesis continuous image.

The learning image generation apparatus 100 according to the present example embodiment described above makes it possible to generate a learning image which is a learning image used for machine learning and is configured with a continuous image. Further, the learning image generation apparatus 100 according to the present example embodiment, which determines the synthesis position of the object based on the posture information of the background camera which generates the background image, enables a movement distance of the object shown in the synthesis continuous image and the like to be natural.

As described above, the learning image generation apparatus 100 according to the present example embodiment makes it possible to increase the number of learning images configured with continuous images and in which unnatural motion of an object shown in the continuous images is reduced.

Second Example Embodiment

The learning image generation apparatus 100 according to the present example embodiment executes a process in the same manner as that of the first example embodiment, but the processing content is specified. This will be described below.

An example of a hardware configuration of the learning image generation apparatus 100 according to the present example embodiment has the same manner as that of the first example embodiment.

An example of a functional block diagram of the learning image generation apparatus 100 according to the present example embodiment is illustrated in FIG. 1. As illustrated, the learning image generation apparatus 100 includes the background image acquisition unit 111, the background camera posture information acquisition unit 112, the object continuous image acquisition unit 113, the synthesis position determination unit 121, and the image synthesis unit 131.

The background image acquisition unit 111 acquires a background image. The background camera posture information acquisition unit 112 acquires posture information of a background camera which generates a background image acquired by the background image acquisition unit 111 when the background image is generated.

Here, an example of a unit which acquires a background image and posture information will be described with reference to the background image acquisition unit 111 and the background camera posture information acquisition unit 112. Note that, this is merely an example and the example is not limited to this.

In this example, the learning image generation apparatus 100 has a background image database (hereinafter, referred to as "background image DB") which stores one or a plurality of background images. The background image stored in the background image DB may include any image, and a publicly available image DB may be used. Further, the background image DB stores posture information of the background camera which generates each background image when each background image is generated.

The background image acquisition unit 111 acquires a background image from the background image DB. The background image acquisition unit 111 can randomly acquire the background image from the background image DB. The background image acquisition unit 111 may acquire the background image stored in the background image DB as it is, or may randomly cut out a part of the background image stored in the background image DB and acquire the part.

Further, the background camera posture information acquisition unit 112 acquires posture information from the background image DB.

The other configurations of the background image acquisition unit 111 and the background camera posture information acquisition unit 112 have the same manner as those in the first example embodiment.

The object continuous image acquisition unit 113 acquires an object continuous image including an object. Hereinafter, the object is a person, but is not limited to this.

Here, an example of a unit which acquires an object continuous image will be described with reference to the object continuous image acquisition unit 113. Note that, this is merely an example and the example is not limited to this.

In the example, the learning image generation apparatus 100 has an object continuous image database (hereinafter, referred to as "object continuous image DB") which stores one or a plurality of object continuous images.

In the object continuous image DB, one or the plurality of object continuous images, person position information indicating a position or an area of a person in each of a plurality of object still images included in each object continuous image, information on a frame rate of each object continuous image are stored. The person position information is, for example, a silhouette image described in the first example embodiment, but is not limited to this.

Note that, height information indicating a height of the person included in each object continuous image may be added to the object continuous image DB. The object continuous image DB may include an object continuous image including any person, but it is preferable that the object continuous image DB includes an object continuous image including various persons having different sex, age, clothes, and the like.

The object continuous image acquisition unit 113 can acquire an object continuous image from the object continuous image DB. In a case where the height information is registered in the object continuous image DB, the height information can be acquired from the object continuous image acquisition unit 113 and the object continuous image DB.

Meanwhile, it is desirable that a frame rate of the object continuous image used for image synthesis by the image synthesis unit 131 is the same as a desired frame rate of a synthesis continuous image. In order to realize this, the object continuous image acquisition unit 113 may acquire an object continuous image having a frame rate equal to or a multiple of the desired frame rate of the synthesis continuous image, from the object continuous image DB. That is, the object continuous image acquisition unit 113 may search the object continuous image DB by using the frame rate as a key and acquire the object continuous image matching the key.

Note that, in a case where an object continuous image which is an integral multiple (twice or more) of the desired frame rate of the synthesis continuous image is acquired, the object continuous image acquisition unit 113 partially extracts a plurality of object still images included in the acquired object continuous image, so that it is possible to generate an object continuous image having the same frame rate as the desired frame rate of the synthesis continuous image. For example, in a case where the desired frame rate of the synthesis continuous image is 10 fps and the frame rate of the acquired object continuous image is 30 fps, by extracting every three object still images from the object continuous image, it is possible to generate an object continuous image having the same frame rate as the desired frame rate of the synthesis continuous image.

The desired frame rate of the synthesis continuous image may be registered in advance in the learning image generation apparatus 100, or an operator may operate the learning image generation apparatus 100 to input the desired frame rate.

Other configurations of the object continuous image acquisition unit 113 have the same manner as those of the first example embodiment.

Based on the posture information of the background camera, the synthesis position determination unit 121 determines a synthesis position of a person included in each of the plurality of object still images on the background image, for each synthesis still image. An example of a specific procedure is as follows.

The synthesis position determination unit 121 first determines where on the background image feet of each person to be synthesized is located in the first synthesis still image in the synthesis continuous image. At this time, the feet may be outside the image. It is natural to define the feet as a midpoint of a straight line connecting centers of the left foot and the right foot (if either foot is lifted, a point on the ground immediately below the midpoint), but the feet are not limited to this definition.

Note that, "first still image in a continuous image" is a still image which is displayed first when the continuous image is reproduced. The "last still image in the continuous image" is a still image displayed last when the continuous image is reproduced. The "N-th still image in the continuous image" is an N-th still image displayed when the continuous image is reproduced. The premise is the same in all the following example embodiments.

Next, the synthesis position determination unit 121 determines an actual movement distance, for which each person moves from the first synthesis still image to the last synthesis still image in the synthesis continuous image. Regarding walking of the person, it is known that a stride of the person is approximately 0.45 times the height, and a time taken for one person to walk one step is approximately 0.5 seconds. From these, it can be seen that the person can walk a distance approximately 0.9 times the height in 1 second. Therefore, the actual movement distance can be estimated from this fact, a reproduction time of the synthesis continuous image, and information of the height of the person (if there is no height information, it is assumed to be an average height of a person in the same manner as the image synthesis unit 131). It is assumed that the movement of this distance also occurs in the synthesis continuous image, and the movement distance on the image (on the background image) from the first synthesis still image to the last synthesis still image of the synthesis continuous image is estimated based on the background camera posture information. A movement direction is the same as that of the object continuous image, and a position of the foot of each person is determined for the last synthesis still image. Regarding the synthesis position of another synthesis still image, the position of the foot is determined by dividing the movement distance from the first synthesis still image to the last synthesis still image at equal intervals. Note that, the actual length and the length on the image may be mutually converted from the camera posture information in the following as well, but this method is widely known and will not be described. Note that, the distance that a person can walk in one second may be computed by taking statistics independently instead of using the above numerical values.

Figure 8:
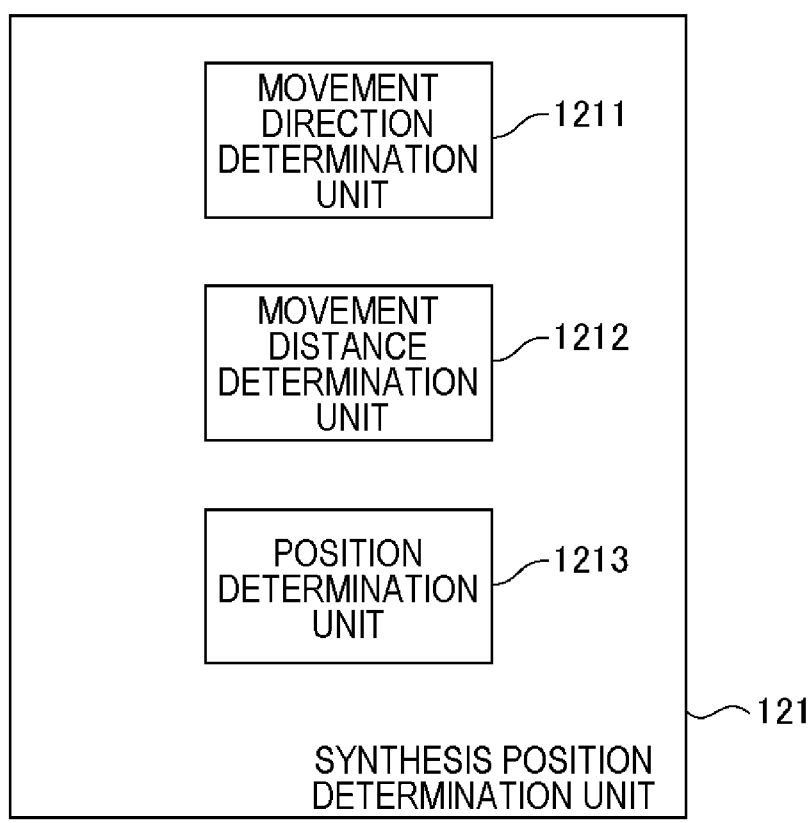
FIG. 8 is an example of a functional block diagram of a synthesis position determination unit according to the present example embodiment.

Next, a specific example of the above process by the synthesis position determination unit 121 will be described. FIG. 8 illustrates an example of a functional block diagram of the synthesis position determination unit 121. As illustrated in FIG. 8, the synthesis position determination unit 121 includes a movement direction determination unit 1211, a movement distance determination unit 1212, and a position determination unit 1213. These cooperate to realize the above process. Hereinafter, a flow of processes will be described with reference to the flowchart in FIG. 9.

First, the position determination unit 1213 randomly determines a synthesis position (the first synthesis position) of a person on a background image in the first synthesis still image in a synthesis continuous image (S20). After that, the position determination unit 1213 uses posture information of a background camera to convert coordinates on the image indicating the first synthesis position into coordinates on a real space (S21). The synthesis position indicates coordinates of a foot of the person, a vertex of a head, a center of a face, or any part of a body on the image. The synthesis position may be determined so that the entire body of the person fits within the image, or the synthesis position may be determined so that a part of the body of the person deviates from the image.

Next, the movement direction determination unit 1211 determines a movement direction on the background image, which is a movement direction of the person on the background image in the synthesis continuous image (S22). For example, the movement direction determination unit 1211 determines the movement direction of the person on the images in the object continuous image as the movement direction on the background image. The movement direction of the person on the images in the object continuous image is, for example, from a position on the image of the person in the first object still image (coordinates on the image) to a position on the image of the person in the last object still image (coordinates on the image). After determining the movement direction on the background image, the movement direction determination unit 1211 uses the posture information of the background camera to convert the movement direction on the background image into a movement direction on the real space (S23).

Next, the movement distance determination unit 1212 determines a distance (an actual movement distance) for which the person moves in the real space during a reproduction time of the synthesis continuous image (S24). The actual movement distance may be determined based on a height of the person indicated by height information acquired by the object continuous image acquisition unit 113 and the reproduction time of the synthesis continuous image. For example, the movement distance determination unit 1212 can compute a product of "0.9 times the height of the person indicated by the height information" and "the reproduction time (seconds) of the synthesis continuous image" as the actual movement distance, as described above. Note that, a coefficient (0.9) by which the height of the person is multiplied can be set to another value according to this. For example, by taking statistics, the coefficient may be independently computed. In a case where the object continuous image acquisition unit 113 does not acquire height information, the object continuous image acquisition unit 113 may compute the actual movement distance by using other values such as an average height of any group.

Figure 9:
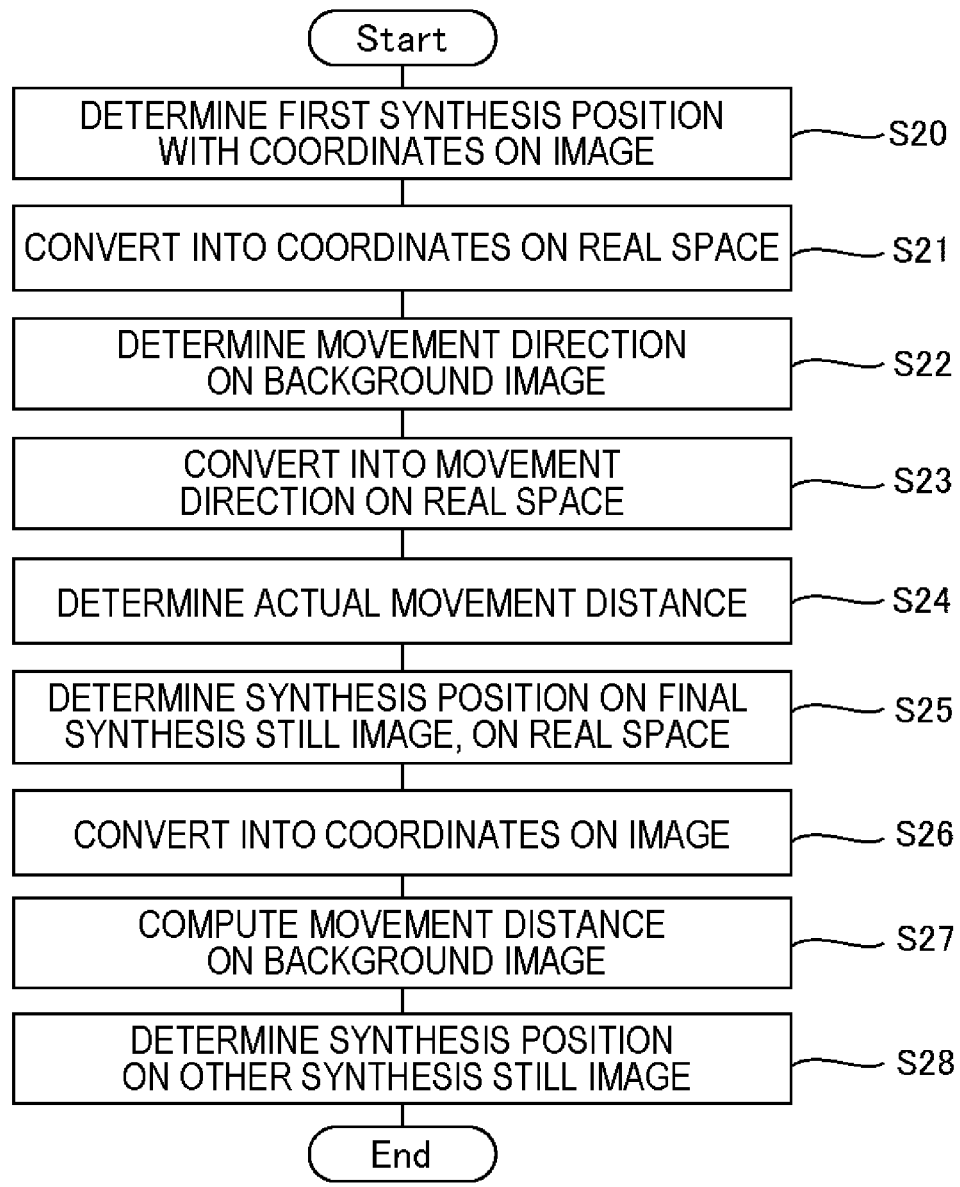
FIG. 9 is a flowchart illustrating an example of a processing flow of the synthesis position determination unit according to the present example embodiment.

Note that, a processing order of the processes in S20 and S21 by the position determination unit 1213, the processes in S22 and S23 by the movement direction determination unit 1211, and the process in S24 by the movement distance determination unit 1212 is limited to that illustrated in the flowchart in FIG. 9, and may be another order, or these may be performed in parallel.

After that, based on the coordinates on the real space indicating the first synthesis position computed in S21, the movement direction on the real space computed in S23, and the actual movement distance computed in S24, the position determination unit 1213 determines a synthesis position in the last synthesis still image.

Specifically, first, the position determination unit 1213 computes an end point position after moving from the "coordinates indicating the first synthesis position" toward the "movement direction on the real space" by the "actual movement distance" in the coordinate system in the real space, and sets the end point position as the synthesis position in the last synthesis still image (S25). After that, by using the posture information of the background camera, the position determination unit 1213 converts the coordinates on the real space indicating the synthesis position in the last synthesis still image into the coordinates on the image (S26).

Next, the movement distance determination unit 1212 computes a straight line distance between the first synthesis position indicated by the coordinates on the image determined in S20 and the synthesis position in the last synthesis still image indicated by the coordinates on the image computed in S26, as the movement distance on the background image (S27).

Next, the position determination unit 1213 determines a synthesis position of another synthesis still image (S28). Specifically, the position determination unit 1213 divides a straight line distance (the movement distance on the background image) between the synthesis position on the image in the first synthesis still image (the first synthesis position) and the synthesis position on the image in the last synthesis still image at equal intervals based on the number of remaining image still images to compute a division distance. The position determination unit 1213 determines, as the synthesis position in the N-th (N>1) synthesis still image, a position after moving for the division distance on the background image from the synthesis position in the (N−1)-th synthesis still image in a movement direction. Note that, a method of dividing the movement distance on the background image is not limited to the equal division, and another division method may be adopted.

Figure 10:
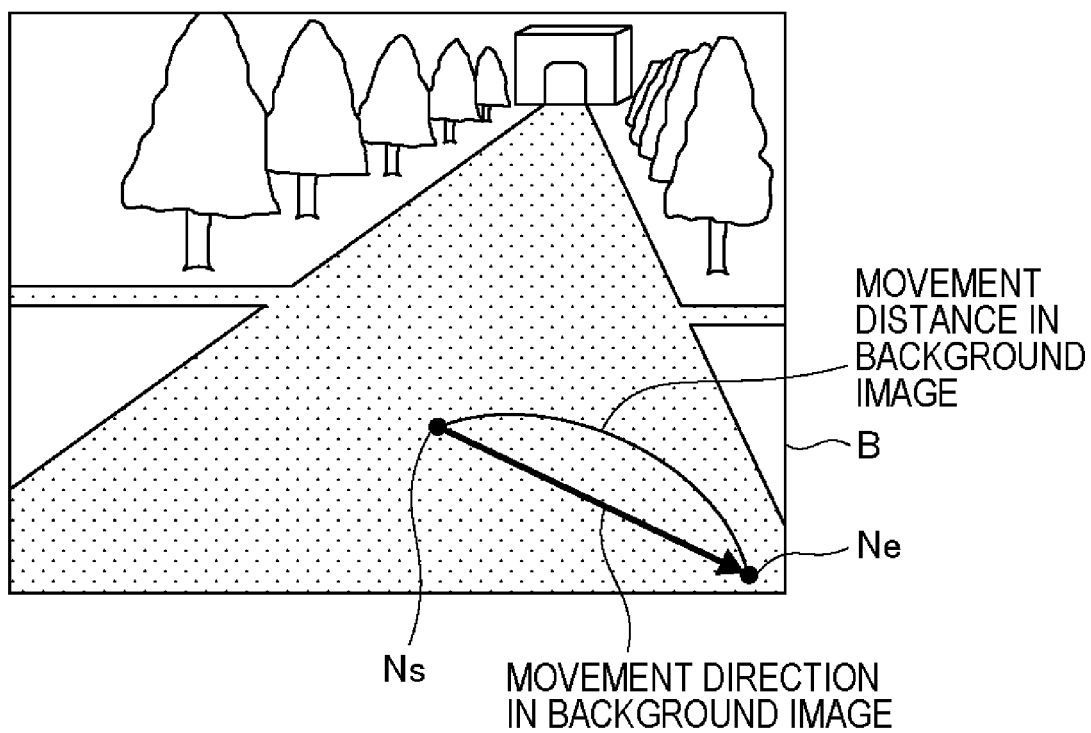
FIG. 10 is a diagram for explaining a movement distance on a background image, a movement direction on the background image, and the like according to the present example embodiment.

FIG. 10 illustrates a concept of a synthesis position Ns (the first synthesis position) of the first synthesis still image, a synthesis position Ne of a last synthesis still image, a movement direction on a background image, and a movement distance on the background image.

Note that, here, an example in which the position determination unit 1213 determines the synthesis position on the first synthesis still image, determines the synthesis position on the last synthesis still image, and then determines synthesis positions on other synthesis still images is described. As a modification example, after determining the synthesis position in the last synthesis still image, the synthesis position in the first synthesis still image may be determined in the same manner, and then the synthesis positions in the other synthesis still images may be determined in the same manner. In this case, the first synthesis position is a synthesis position in the last synthesis still image. In the process in S25, the position determination unit 1213 computes an end point position after moving by the "actual movement distance" from "coordinates indicating the first synthesis position" in a "direction opposite to the movement direction in the real space (180° opposite direction)" in a coordinate system in the real space, and this is set as the synthesis position in the first synthesis still image.

As described above, the position determination unit 1213 determines one synthesis position among the plurality of synthesis still images included in the synthesis continuous image, and then determines a synthesis position of the other synthesis still image based on the movement direction on the background image and the movement distance on the background image.

The other configurations of the synthesis position determination unit 121 have the same manner as those of the first example embodiment.

Based on the background image acquired by the background image acquisition unit 111, the object continuous image acquired by the object continuous image acquisition unit 113, and the synthesis position determined by the synthesis position determination unit 121, the image synthesis unit 131 synthesizes the person included in each of the plurality of object still images with the background image and generates a plurality of synthesis still images to generate a synthesis continuous image.

Note that, the image synthesis unit 131 may adjust (enlarge/reduce) a size of the image indicating the person cut out from the object still image, and then synthesize the image on the background image. The image synthesis unit 131 can adjust a size of the cut image based on the synthesis position, the height of the person, and the posture information of the background camera so that the person on the background image has a natural size. For example, the size of the cut image can be adjusted so that the height of the person acquired by converting coordinates of a vertex of a head and coordinates of a foot of the person on the background image into coordinates of the real space becomes a predetermined height. The predetermined height may be a height of each person indicated by the height information described above, or may be an average height of any group or the like.

The other configurations of the image synthesis unit 131 have the same manner as those of the first example embodiment.

An example of a flow of the processes of the learning image generation apparatus 100 according to the present example embodiment has the same manner as that of the first example embodiment.

The learning image generation apparatus 100 according to the present example embodiment described above achieves the same advantageous effect as that of the first example embodiment.

Third Example Embodiment

The learning image generation apparatus 100 according to the present example embodiment is different from that of the second example embodiment in a means which computes a movement distance on a background image. Other configurations have the same manner as those of the second example embodiment. This will be described below.

An example of a hardware configuration of the learning image generation apparatus 100 according to the present example embodiment has the same manner as that of the first and second example embodiments.

Figure 11:
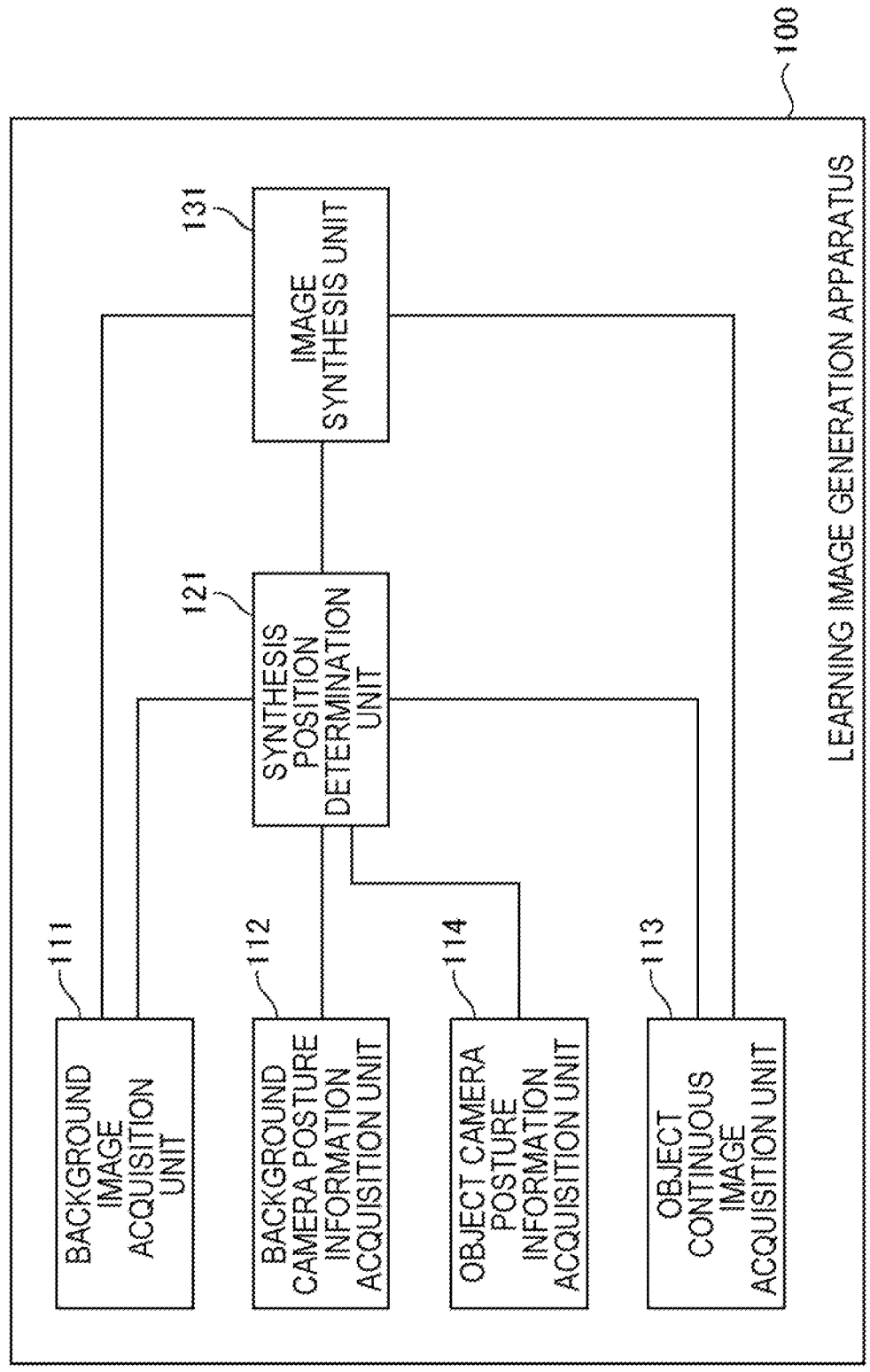
FIG. 11 is an example of a functional block diagram of the learning image generation apparatus according to the present example embodiment.

An example of a functional block diagram of the learning image generation apparatus 100 according to the present example embodiment is illustrated in FIG. 11. As illustrated, the learning image generation apparatus 100 includes the background image acquisition unit 111, the background camera posture information acquisition unit 112, the object continuous image acquisition unit 113, an object camera posture information acquisition unit 114, the synthesis position determination unit 121, and the image synthesis unit 131.

An example of a functional block diagram of the synthesis position determination unit 121 is illustrated in FIG. 8 in the same manner as in the second example embodiment. As illustrated in FIG. 8, the synthesis position determination unit 121 includes the movement direction determination unit 1211, the movement distance determination unit 1212, and the position determination unit 1213.

The configurations of the background image acquisition unit 111, the background camera posture information acquisition unit 112, the object continuous image acquisition unit 113, the image synthesis unit 131, the movement direction determination unit 1211, and the position determination unit 1213 are the same as those in the first and second example embodiments.

The object camera posture information acquisition unit 114 acquires posture information of an object camera which generates an object continuous image when the image is generated. For example, with camera calibration, internal parameters (a focal length, image center coordinates, a distortion coefficient, and the like) or external parameters (a rotation matrix, a translation vector, and the like) of the object camera when the object continuous image is generated are computed. The object camera posture information acquisition unit 114 acquires the internal parameters or the external parameters as posture information. Note that, the posture information of the object camera which generates each object continuous image when the image is generated may be registered in the object continuous image DB described in the second example embodiment. The object camera posture information acquisition unit 114 may acquire the posture information of the object camera from the object continuous image DB.

The movement distance determination unit 1212 determines a distance (an actual movement distance) for which the person moves in the real space during a reproduction time of the synthesis continuous image by a means different from the second example embodiment. Specifically, the movement distance determination unit 1212 computes the actual movement distance of the object shown in the object continuous image, based on the object continuous image and the posture information of the object camera. For example, the movement distance determination unit 1212 converts coordinates of the person in the image in the first object still image into coordinates in the real space, based on the posture information of the object camera. Further, the movement distance determination unit 1212 converts coordinates of the person on the image in the last object still image into coordinates in the real space based on the posture information of the object camera. The movement distance determination unit 1212 computes a straight line distance between the two computed coordinates in the real space as the actual movement distance. Note that, a reproduction time from the first object still image to the last object still image is the same as the reproduction time of the synthesis continuous image.

An example of a flow of the processes of the learning image generation apparatus 100 according to the present example embodiment has the same manner as that of the first and second example embodiments.

The learning image generation apparatus 100 according to the present example embodiment described above achieves the same advantageous effect as that of the first and second example embodiments.

Further, according to the learning image generation apparatus 100 according to the present example embodiment, the actual movement distance of the person shown in the object continuous image can be computed, and the synthesis position of the person can be determined so that the person moves for the movement distance in the synthesis continuous image.

Also in the first example embodiment in which the actual movement distance is estimated based on the height, it is possible to resolve unnaturalness of the movement distance. However, even with the same height, walking speeds are different from each other, so the actual movement distances may be different from each other. When the walking speed is different, a speed at which the hands and feet move is different. In a case of determining the synthesis position so that persons with the same height but different hand and foot movement speeds move the same distance, it can be a little unnatural.

According to the learning image generation apparatus 100 according to the present example embodiment, which is capable of computing an actual movement distance of a person shown in an object continuous image and determining a synthesis position of the person so that the person moves by a movement distance in a synthesis continuous image, it is possible to reduce such unnaturalness. In addition, it is possible to generate a synthesis continuous image with less strangeness even for a person who walks differently from the average walking, such as an elderly person, a child, and a poor physical condition. Therefore, it is possible to generate more various synthesis continuous images.

Fourth Example Embodiment

The learning image generation apparatus 100 according to the present example embodiment is different from the first to third example embodiments in that a plurality of persons can be synthesized into one background image. Other configurations have the same manner as those of the first to third example embodiments. This will be described below.

An example of a hardware configuration of the learning image generation apparatus 100 according to the present example embodiment has the same manner as that of the first to third example embodiments.

An example of a functional block diagram of the learning image generation apparatus 100 according to the present example embodiment is illustrated in FIG. 1 or FIG. 11. As illustrated in FIG. 1, the learning image generation apparatus 100 includes the background image acquisition unit 111, the background camera posture information acquisition unit 112, the object continuous image acquisition unit 113, the synthesis position determination unit 121, and the image synthesis unit 131. As illustrated in FIG. 11, the learning image generation apparatus 100 may further include the object camera posture information acquisition unit 114.

An example of the functional block diagram of the synthesis position determination unit 121 is illustrated in FIG. 8. As illustrated in FIG. 8, the synthesis position determination unit 121 includes a movement direction determination unit 1211, a movement distance determination unit 1212, and a position determination unit 1213.

The configurations of the background image acquisition unit 111, the background camera posture information acquisition unit 112, the object continuous image acquisition unit 113, and the object camera posture information acquisition unit 114 have the same manner as those in the first to third example embodiments.

The synthesis position determination unit 121 determines a synthesis position of each of a plurality of persons on the same background image in the same manner as in the first to third example embodiments. Other configurations of the synthesis position determination unit 121 have the same manner as those of the first to third example embodiments. The configurations of the movement direction determination unit 1211, the movement distance determination unit 1212 and the position determination unit 1213 have the same manner as those in the second and third example embodiments.

The image synthesis unit 131 synthesizes the plurality of persons on one background image. A means which synthesizes the person with the background image has the same manner as in the first to third example embodiments. The image synthesis unit 131 can perform synthesis in order from a person who is far from the camera. Note that, in a case where a part or all of a person synthesized later overlaps with a person synthesized earlier on the image, the image of the person synthesized later is positioned on the upper side. In this case, an overlapping part of the previously synthesized person does not appear on the image.

An order of distances from the camera can be determined by any means, and for example, coordinates of the feet of each person synthesized on the background image are computed based on the synthesis position determined for each person, and a person having foot coordinates closer to the lower end of the image may be determined as a person having a smaller distance from the camera.

An example of a flow of the processes of the learning image generation apparatus 100 according to the present example embodiment has the same manner as that of the first to third example embodiments.

The learning image generation apparatus 100 according to the present example embodiment described above achieves the same advantageous effect as that of the first to third example embodiments. Further, the learning image generation apparatus 100 according to the present example embodiment, which is capable of synthesizing the plurality of persons on one background image, makes it possible to generate various synthesis continuous images.

Fifth Example Embodiment

The learning image generation apparatus 100 according to the present example embodiment is different from the first to fourth example embodiments in that a unit which determines whether there is no inconsistency between synthesis positions of a plurality of persons in a case where the plurality of persons are synthesized into one background image is provided. Other configurations have the same manner as those of the first to fourth example embodiments. This will be described below.

An example of a hardware configuration of the learning image generation apparatus 100 according to the present example embodiment has the same manner as that of the first to fourth example embodiments.

An example of a functional block diagram of the learning image generation apparatus 100 according to the present example embodiment is illustrated in FIG. 1 or FIG. 11. As illustrated in FIG. 1, the learning image generation apparatus 100 includes the background image acquisition unit 111, the background camera posture information acquisition unit 112, the object continuous image acquisition unit 113, the synthesis position determination unit 121, and the image synthesis unit 131. As illustrated in FIG. 11, the learning image generation apparatus 100 may further include the object camera posture information acquisition unit 114.

Figure 12:
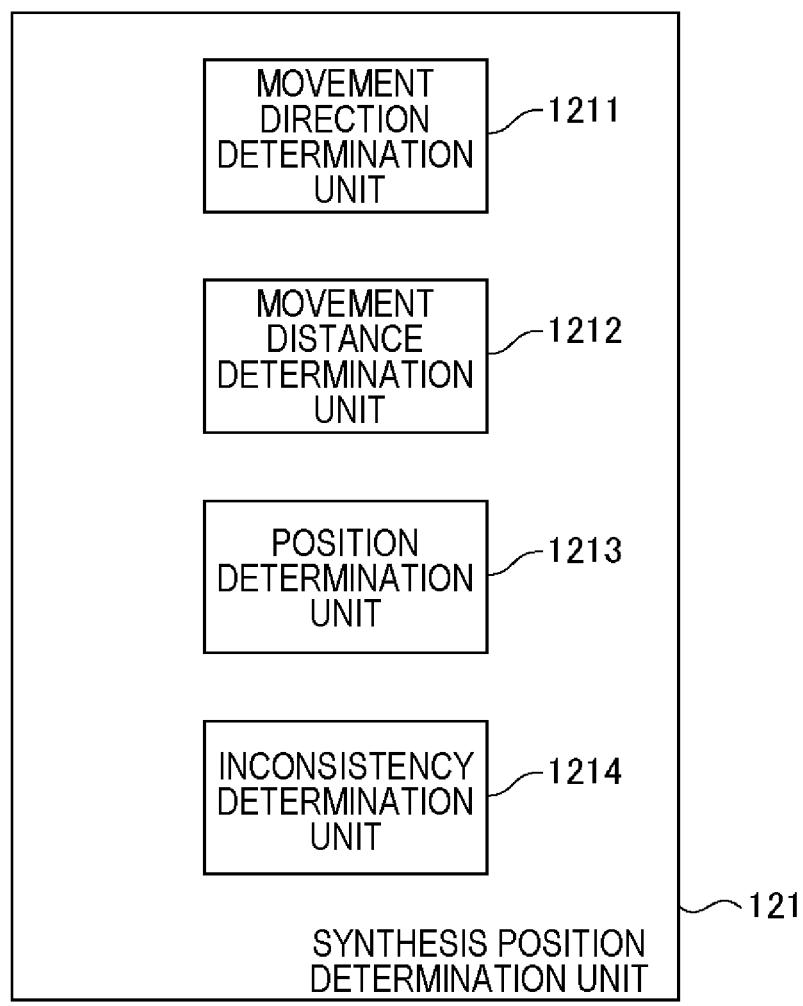
FIG. 12 is an example of a functional block diagram of the synthesis position determination unit according to the present example embodiment.

An example of the functional block diagram of the synthesis position determination unit 121 is illustrated in FIG. 12. As illustrated in FIG. 12, the synthesis position determination unit 121 includes the movement direction determination unit 1211, the movement distance determination unit 1212, the position determination unit 1213, and an inconsistency determination unit 1214.

The configurations of the background image acquisition unit 111, the background camera posture information acquisition unit 112, the object continuous image acquisition unit 113, and the object camera posture information acquisition unit 114 have the same manner as those in the first to fourth example embodiments.

The inconsistency determination unit 1214 determines whether there is no inconsistency between synthesis positions of the plurality of objects determined by the position determination unit 1213.

Figure 13:
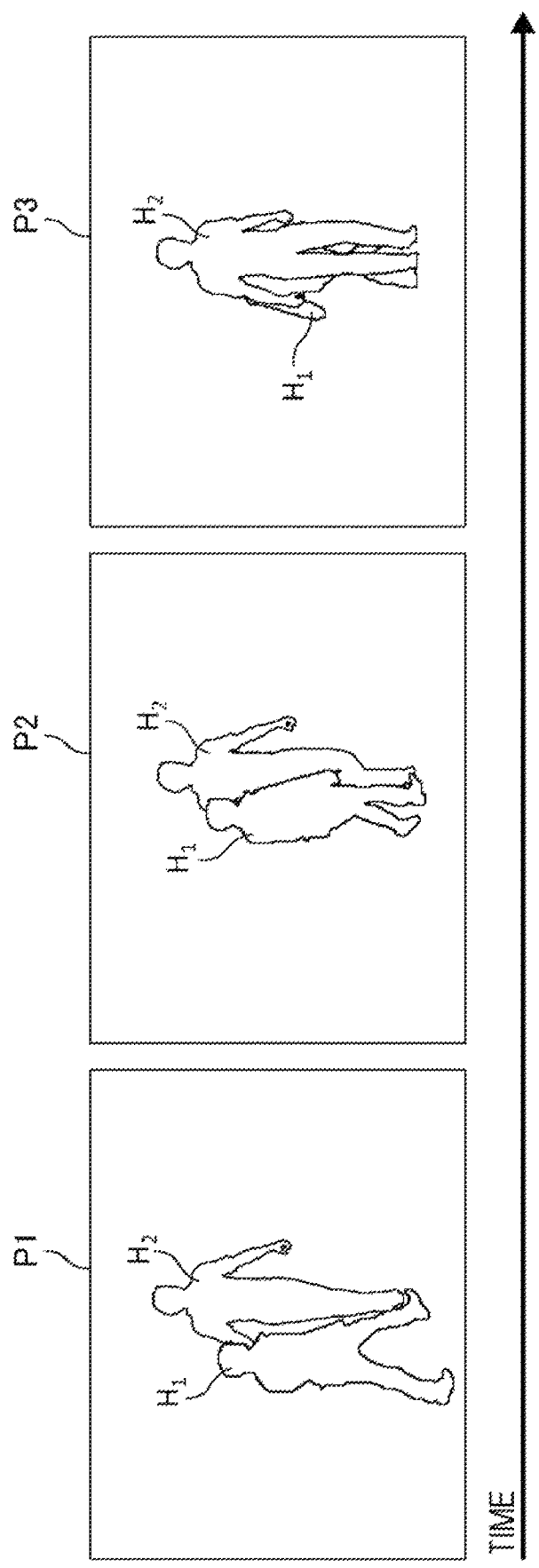
FIG. 13 is a diagram for explaining a process of an inconsistency determination unit according to the present example embodiment.

Here, the inconsistency determined by the inconsistency determination unit 1214 will be described with reference to FIG. 13. FIG. 13 illustrates three synthesis still images $P_1$ to $P_3$. Note that, since a background image and a detailed appearance of a person are not necessary for the description here, the background image and the detailed appearance will not be repeated in FIG. 13.

In the synthesis still image $P_1$ and the synthesis still image $P_2$, a person $H_1$ is located on the near side of a screen and a person $H_2$ is located on the far side of the screen. However, in the synthesis still image $P_3$ immediately after the synthesis still image $P_2$, the person $H_1$ is located on the far side of the screen and the person $H_2$ is located on the near side of the screen. When such a change in arrangement order of the person suddenly appears, it becomes unnatural. Note that, the unnaturalness of the change in the arrangement order appears not only in the arrangement order in the forward-rearward direction in FIG. 13, but also in the arrangement order in the rightward-leftward direction in FIG. 13.

Based on the synthesis position determined by the position determination unit 1213, the inconsistency determination unit 1214 determines whether or not there is any unnaturalness in the arrangement order of the plurality of persons as described above.

For example, in a case where a distance in the rightward-leftward direction on the image between a synthesis position of the first person and a synthesis position of the second person in the N-th synthesis still image is equal to or less than a threshold value, and in a case where an arrangement order of a synthesis position of the first person and a synthesis position of the second person in the forward-rearward direction on the image is reversed between the N-th synthesis still image and the (N+1)-th synthesis still image, the inconsistency determination unit 1214 may determine that there is an inconsistency.

The first person and the second person satisfying the condition of "the distance between the synthesis position of the first person and the synthesis position of the second person in the rightward-leftward direction on the image is equal to or less than the threshold value" are in a state of being so close to each other in the rightward-leftward direction on the image that exchanging the arrangement order of the front and rear on the image requires motion of one dodging the other (motion of moving in the rightward-leftward direction in FIG. 13). As to the two persons in a state requiring such a dodging motion for exchanging the arrangement order of the front and rear on the image, it is unnatural that the arrangement order of the front and rear on the image is interchanged between the two consecutive synthesis still images. The inconsistency determination unit 1214 can detect such an inconsistency.

Note that, the arrangement order in the forward-rearward direction on the image can be determined based on coordinates of the feet of each person, for example. For example, the arrangement order is determined based on a rule that the person having the coordinates of the feet closer to the lower end of the image is in front.

Further, in a case where a distance in the upward-downward direction in FIG. 13 between the synthesis position of the first person and the synthesis position of the second person in the N-th synthesis still image is equal to or less than a threshold value, and in a case where an arrangement order of a synthesis position of the first person and a synthesis position of the second person in the rightward-leftward direction in FIG. 13 is reversed between the N-th synthesis still image and the (N+1)-th synthesis still image, the inconsistency determination unit 1214 may determine that there is an inconsistency.

The first person and the second person satisfying the condition of "the distance between the synthesis position of the first person and the synthesis position of the second person in the upward-downward direction on the image is equal to or less than the threshold value" are in a state of being so close to each other in the upward-downward direction on the image that exchanging the arrangement order of the left and right on the image requires motion of one dodging the other (motion of moving in the upward-downward direction in FIG. 13). As to the two persons in a state requiring such a dodging motion for exchanging the arrangement order of the left and right on the image, it is unnatural that the arrangement order of the left and right on the image is interchanged between the two consecutive synthesis still images. The inconsistency determination unit 1214 can detect such an inconsistency.

When the inconsistency determination unit 1214 determines that there is inconsistency, the synthesis position determination unit 121 redetermines a synthesis position. Other configurations of the synthesis position determination unit 121 have the same manner as those of the first to fourth example embodiments. The configurations of the movement direction determination unit 1211, the movement distance determination unit 1212 and the position determination unit 1213 have the same manner as those in the second and to fourth example embodiments.

The image synthesis unit 131 generates a synthesis continuous image based on the synthesis position determined to be consistent by the inconsistency determination unit 1214. The other configurations of the image synthesis unit 131 have the same manner as those of the first to fourth example embodiments.

Figure 14:
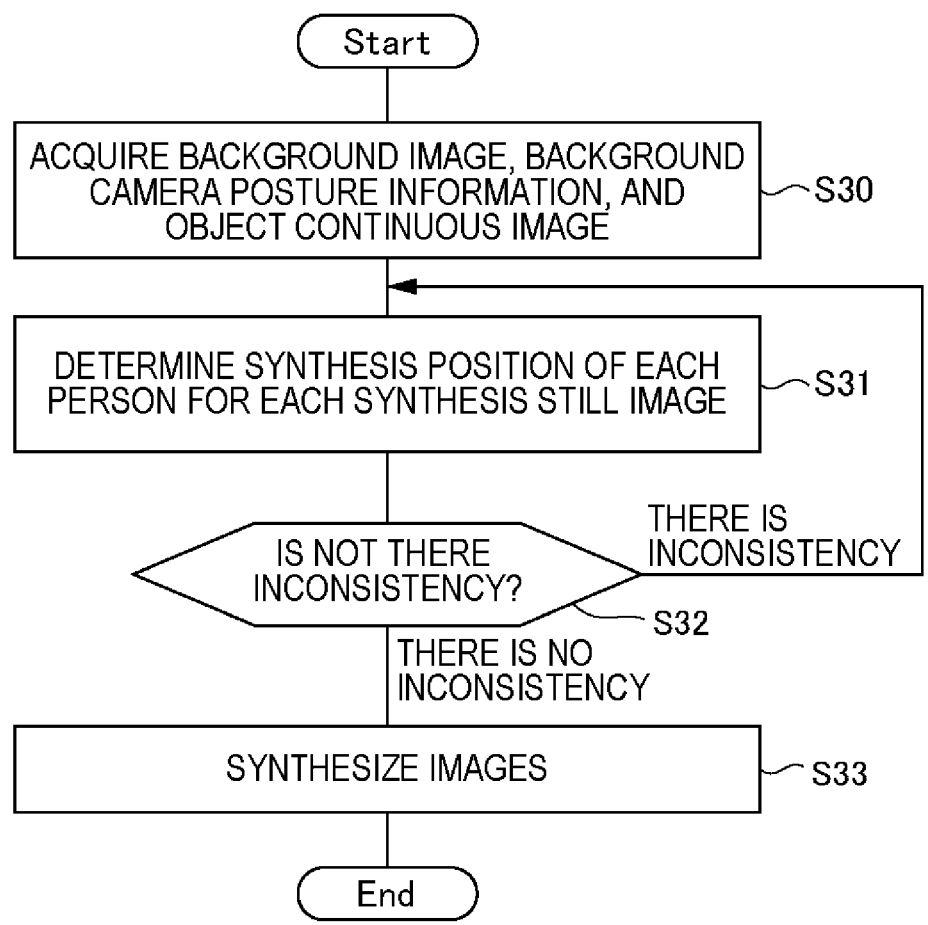
FIG. 14 is a flowchart illustrating an example of a processing flow of the learning image generation apparatus according to the present example embodiment.

Next, an example of a flow of a process of the learning image generation apparatus 100 according to the present example embodiment will be described by using the flowchart in FIG. 14.

In S30, the background image acquisition unit 111 acquires a background image. In S30, the background camera posture information acquisition unit 112 acquires posture information of a background camera which generates a background image acquired by the background image acquisition unit 111 when the background image is generated. Further, in S30, the object continuous image acquisition unit 113 acquires an object continuous image including an object.

Note that, the background image acquisition unit 111 acquiring the background image, the background camera posture information acquisition unit 112 acquiring the posture information of the background camera, and the object continuous image acquisition unit 113 acquiring the object continuous image may be executed in any order or in parallel.

In S31, the synthesis position determination unit 121 determines a synthesis position on the background image of each person included in each of the plurality of object still images, for each synthesis still image.

In S32, the inconsistency determination unit 1214 determines whether there is no inconsistency between the synthesis positions of a plurality of persons. Since details of determination are as described above, the description here will not be repeated.

When the inconsistency determination unit 1214 determines that there is an inconsistency (There is inconsistency in S32), the process returns to S31 and the synthesis position determination unit 121 redetermines a synthesis position. On the other hand, in a case where the inconsistency determination unit 1214 determines that there is no inconsistency (There is no inconsistency in S32), based on the background image acquired by the background image acquisition unit 111, the object continuous image acquired by the object continuous image acquisition unit 113, and the synthesis position determined by the synthesis position determination unit 121, the image synthesis unit 131 synthesizes the plurality of persons with the background image and generates a plurality of synthesis still images to generate a synthesis continuous image (S33).

The learning image generation apparatus 100 according to the present example embodiment described above achieves the same advantageous effect as that of the first to fourth example embodiments. Further, it is possible to reduce unnaturalness of the arrangement order which may occur when the plurality of persons are synthesized. As a result, it is possible to reduce unnaturalness and generate various synthesis continuous images.

Hereinafter, appendixes to examples of reference forms will be added.

1. A learning image generation apparatus including: a background image acquisition unit that acquires a background image;

a background camera posture information acquisition unit that acquires posture information of a background camera which generates the background image;

an object continuous image acquisition unit that acquires an object continuous image including an object;

a synthesis position determination unit that determines a synthesis position on the background image of the object included in each of a plurality of object still images included in the object continuous image based on the posture information of the background camera; and an image synthesis unit that synthesizes the object included in each of the plurality of object still images with the background image to generate a synthesis continuous image, based on the background image, the object continuous image, and the synthesis position determined by the synthesis position determination unit.

2. The learning image generation apparatus according to appendix 1,
in which the synthesis position determination unit includes
a movement direction determination unit that determines a movement direction on the background image, which is a movement direction of the object on the background image in the synthesis continuous image,
a movement distance determination unit that determines a movement distance on the background image, which is a movement distance of the object on the background image in the synthesis continuous image, based on the posture information of the background camera, and
a position determination unit that determines the synthesis position, based on the movement direction on the background image and the movement distance on the background image.

3. The learning image generation apparatus according to appendix 2,
in which the object is a person, and
the movement distance determination unit
estimates an actual movement distance, for which the person moves within a reproduction time of the synthesis continuous image, based on height information indicating a height of the person and the reproduction time, and
converts the actual movement distance into the movement distance on the background image, based on the posture information of the background camera.

4. The learning image generation apparatus according to appendix 2, further including:
an object camera posture information acquisition unit that acquires posture information of an object camera which generates the object continuous image,
in which the movement distance determination unit
computes an actual movement distance of the object, based on the object continuous image and the posture information of the object camera, and
converts the actual movement distance into the movement distance on the background image, based on the posture information of the background camera.

5. The learning image generation apparatus according to any one of appendixes 1 to 4,
in which the position determination unit
determines the synthesis positions for one of a plurality of synthesis still images included in the synthesis continuous image, and then determines the synthesis position of another synthesis still image included in the synthesis continuous image, based on the movement direction on the background image and the movement distance on the background image.

6. The learning image generation apparatus according to any one of appendixes 1 to 5,
in which the synthesis position determination unit determines the synthesis position of each of a plurality of the objects, and
the image synthesis unit synthesizes the plurality of objects with one background image.

7. The learning image generation apparatus according to appendix 6,
in which the synthesis position determination unit includes an inconsistency determination unit that determines whether or not there is an inconsistency between the synthesis positions of the plurality of objects.

8. A learning image generation method executed by a computer, the method including:
a background image acquisition step of acquiring a background image;
a background camera posture information acquisition step of acquiring posture information of a background camera which generates the background image;
an object continuous image acquisition step of acquiring an object continuous image including an object;
a synthesis position determination step of determining a synthesis position on the background image of the object included in each of a plurality of object still images included in the object continuous image based on the posture information of the background camera; and
an image synthesis step of synthesizing the object included in each of the plurality of object still images with the background image to generate a synthesis continuous image, based on the background image, the object continuous image, and the synthesis position determined by the synthesis position determination unit.

9. A program causing a computer to function as:
a background image acquisition unit that acquires a background image;
a background camera posture information acquisition unit that acquires posture information of a background camera which generates the background image;
an object continuous image acquisition unit that acquires an object continuous image including an object;
a synthesis position determination unit that determines a synthesis position on the background image of the object included in each of a plurality of object still images included in the object continuous image based on the posture information of the background camera; and
an image synthesis unit that synthesizes the object included in each of the plurality of object still images with the background image to generate a synthesis continuous image, based on the background image, the object continuous image, and the synthesis position determined by the synthesis position determination unit.

The invention claimed is:
1. A learning image generation apparatus comprising:
at least one memory configured to store one or more instructions; and
at least one processor configured to execute the one or more instructions to:
acquire a background image;
acquire posture information of a background camera which generates the background image;
acquire an object continuous image including an object;
determine a synthesis position on the background image of the object included in each of a plurality of object still images included in the object continuous image based on the posture information of the background camera;
synthesize the object included in each of the plurality of object still images with the background image to generate a synthesis continuous image, based on the background image, the object continuous image, and the determined synthesis position;
estimate an actual movement distance for which the object moves in a real space during a reproduction time of the synthesis continuous image;
convert the actual movement distance into a movement distance on the background image, which is a movement distance of the object on the background image in the synthesis continuous image, based on the posture information of the background camera; and determine the synthesis position on the background image of the object so that the object moves, on the background image, for the movement distance on the background image, during the reproduction time of the synthesis continuous image.

2. The learning image generation apparatus according to claim 1,
wherein the processor is further configured to execute the one or more instructions to:
determine a movement direction on the background image, which is a movement direction of the object on the background image in the synthesis continuous image,
and
determine the synthesis position, based on the movement direction on the background image and the movement distance on the background image.

3. The learning image generation apparatus according to claim 2,
wherein the object is a person, and
the actual movement distance is estimated based on height information indicating a height of the person and the reproduction time.

4. The learning image generation apparatus according to claim 2, wherein the processor is further configured to execute the one or more instructions to
acquire posture information of an object camera which generates the object continuous image,
wherein
the actual movement distance of the object is computed based on the object continuous image and the posture information of the object camera.

5. The learning image generation apparatus according to claim 2,
wherein the processor is further configured to execute the one or more instructions to determine the synthesis positions for one of a plurality of synthesis still images included in the synthesis continuous image, and then determine the synthesis position of another synthesis still image included in the synthesis continuous image, based on the movement direction on the background image and the movement distance on the background image.

6. The learning image generation apparatus according to claim 1,
wherein the processor is further configured to execute the one or more instructions to:
determine the synthesis position of each of a plurality of the objects, and
synthesize the plurality of objects with one background image.

7. The learning image generation apparatus according to claim 6,
wherein the processor is further configured to execute the one or more instructions to determine whether or not there is an inconsistency between the synthesis positions of the plurality of objects.

8. A learning image generation method executed by a computer, the method comprising:
acquiring a background image;
acquiring posture information of a background camera which generates the background image;
acquiring an object continuous image including an object;
determining a synthesis position on the background image of the object included in each of a plurality of object still images included in the object continuous image based on the posture information of the background camera;
synthesizing the object included in each of the plurality of object still images with the background image to generate a synthesis continuous image, based on the background image, the object continuous image, and the determined synthesis position;
estimating an actual movement distance for which the object moves in a real space during a reproduction time of the synthesis continuous image;
converting the actual movement distance into a movement distance on the background image, which is a movement distance of the object on the background image in the synthesis continuous image, based on the posture information of the background camera; and
determining the synthesis position on the background image of the object so that the object moves, on the background image, for the movement distance on the background image, during the reproduction time of the synthesis continuous image.

9. A non-transitory storage medium storing a program causing a computer to:
acquire a background image;
acquire posture information of a background camera which generates the background image;
acquire an object continuous image including an object;
determine a synthesis position on the background image of the object included in each of a plurality of object still images included in the object continuous image based on the posture information of the background camera; and
synthesize the object included in each of the plurality of object still images with the background image to generate a synthesis continuous image, based on the background image, the object continuous image, and the determined synthesis position;
estimate an actual movement distance for which the object moves in a real space during a reproduction time of the synthesis continuous image;
convert the actual movement distance into a movement distance on the background image, which is a movement distance of the object on the background image in the synthesis continuous image, based on the posture information of the background camera; and
determine the synthesis position on the background image of the object so that the object moves, on the background image, for the movement distance on the background image, during the reproduction time of the synthesis continuous image.

\* \* \* \* \*